United States Patent
Mulet et al.

(10) Patent No.: US 10,415,788 B2
(45) Date of Patent: Sep. 17, 2019

(54) DISPLAY ASSEMBLY COMPRISING A GLASS-CERAMIC PLATE

(75) Inventors: Jean-Philippe Mulet, Montreuil (FR); Bertrand Charpentier, Chateau-Thierry (FR); Pablo Vilato, Paris (FR); Michael Bourgeois, Paris (FR)

(73) Assignee: EUROKERA S.N.C., Chateau-Thierry (FR)

(*) Notice: Subject to any disclaimer, the term of this patent is extended or adjusted under 35 U.S.C. 154(b) by 588 days.

(21) Appl. No.: 13/520,454

(22) PCT Filed: Nov. 30, 2010

(86) PCT No.: PCT/FR2010/052568
§ 371 (c)(1),
(2), (4) Date: Jul. 3, 2012

(87) PCT Pub. No.: WO2011/089327
PCT Pub. Date: Jul. 28, 2011

(65) Prior Publication Data
US 2013/0070451 A1   Mar. 21, 2013

(30) Foreign Application Priority Data
Jan. 21, 2010   (FR) .................................. 10 50387

(51) Int. Cl.
*C03C 10/00* (2006.01)
*F21V 1/02* (2006.01)

(52) U.S. Cl.
CPC ............ *F21V 1/02* (2013.01); *C03C 10/0027* (2013.01)

(58) Field of Classification Search
CPC .......... C03C 10/0027; F21V 1/02; H05B 3/74
(Continued)

(56) References Cited

U.S. PATENT DOCUMENTS

| 6,788,011 | B2 * | 9/2004 | Mueller et al. ............... 315/294 |
| 6,846,760 | B2 | 1/2005 | Siebers et al. |

(Continued)

FOREIGN PATENT DOCUMENTS

| EP | 1 465 460 | 10/2004 |
| EP | 1465460 A2 * | 10/2004 | ............... H02B 3/74 |

(Continued)

OTHER PUBLICATIONS

Color, Wikipedia, Wikimedia Foundations, Inc., Jun. 5, 2014.*
International Search Report dated Apr. 14, 2011 in PCT/FR10/52568 Filed Nov. 30, 2010.

*Primary Examiner* — Sophie Hon
(74) *Attorney, Agent, or Firm* — Oblon, McClelland, Maier & Neustadt, L.L.P.

(57) ABSTRACT

Display assembly 1 comprising, on the one hand, a glass-ceramic plate 2 of the lithium aluminosilicate type, the optical transmission of which for a thickness of 4 mm is between 0.2% and 4% for at least one wavelength between 400 and 500 nm and, on the other hand, a luminous device 4, characterized in that the luminous device 4 comprises at least one polychromatic light source 5 having at least a first emission of nonzero intensity at said wavelength between 400 and 500 nm and at least a second emission of more than 500 nm, and such that the positioning of said source 5 is designed to allow display through said glass-ceramic plate 2.

13 Claims, 8 Drawing Sheets

(58) Field of Classification Search
USPC .............................. 428/1.51, 1.62; 362/231
See application file for complete search history.

(56) References Cited

U.S. PATENT DOCUMENTS

2003/0008759 A1*  1/2003  Costin et al. ................... 501/32
2004/0121895 A1    6/2004  Comte et al.
2005/0143247 A1*  6/2005  Siebers et al. .................... 501/4
2008/0268282 A1* 10/2008  Spindler et al. ............. 428/690

FOREIGN PATENT DOCUMENTS

JP           4 120897        7/2008
WO    WO 2011089327 A1 *    7/2011

\* cited by examiner

DISPLAY ASSEMBLY COMPRISING A GLASS-CERAMIC PLATE

The invention relates to the field of glass-ceramics

It relates more precisely to a display assembly comprising a luminous device and a glass-ceramic plate of the lithium aluminosilicate type.

Glass-ceramics are intended especially to be used as cooking articles, in particular as hobs covering heating elements such as halogen or radiant heating elements, or as cooking utensils.

Glass-ceramics of the lithium aluminosilicate type have proved to be very suitable for these uses because of their esthetic character, which can be varied widely, their mechanical properties, especially their high impact strength due to their low thermal expansion coefficient in the range of operating temperatures, and their chemical properties, namely their resistance to both acids and bases.

Conventionally, a glass-ceramic is produced in several steps: a) melting of the batch materials containing at least one nucleating agent; b) forming and cooling of the glass, called the "mother glass"—at a temperature lower than its conversion range; and c) heat treatment to ceramize the glass.

This "ceramization" heat treatment makes it possible, in one of its embodiments, to grow within the glass crystals of β-quartz structure that have the particular feature of having a negative thermal expansion coefficient.

The presence, in the final glass-ceramic, of such crystals and of a residual glassy phase, makes it possible to obtain a zero or very low overall thermal expansion coefficient (the absolute value of the expansion coefficient is typically less than or equal to $15 \times 10^{-7}/°C$., or even $5 \times 10^{-7}/°C$.). The size of the β-quartz crystals is generally very small, typically between 30 and 70 nanometers, so as not to scatter visible light.

Glass-ceramics also possess specific optical properties that depend on their usage. Thus, in the case of a hob, it is important for the glass-ceramic to have low transmission for visible light so that the user is unable to distinguish, or to do so only with difficulty, the underlying heating elements when they are not operating. However, at the same time the hob must allow the heating elements to be seen when they are heating, without however dazzling the user, so as to reduce the risk of being burnt on contact with the hotplate. The glass-ceramic must also have good energy transmission properties, in particular for infrared radiation produced by the heating elements, in order to allow the food to be heated to the desired temperature in the shortest possible time period.

Current hobs are generally tinted using vanadium oxide. Vanadium oxide is added to the batch materials of the mother glass before the melting operation, and it gives, after ceramization, a very pronounced brown-orange tint, due to reduction of the vanadium.

Such glass-ceramics tinted solely using vanadium oxide transmit the wavelengths lying within the red (above 600 nm), so that the heating elements are visible when they are taken to high temperature. The displays produced using light-emitting diodes (or LEDs) emitting in the red are also visible through the hob and therefore particularly suitable for this type of glass-ceramic.

For esthetic reasons, there has recently appeared a need also to be able to see displays of different colors, something which is especially difficult because of very low transmission factors in the visible outside the red range for glass-ceramic plates currently available commercially.

The aim of the invention is to alleviate the aforementioned drawbacks with a display assembly 1 comprising, on the one hand, a glass-ceramic plate 2 of the lithium aluminosilicate type, the optical transmission of which for a thickness of 4 mm is between 0.2% and 4% for at least one wavelength between 400 and 500 nm and, on the other hand, a luminous device 4, noteworthy in that the luminous device 4 comprises at least one polychromatic light source 5 having at least a first emission of nonzero intensity at said wavelength between 400 and 500 nm and at least a second emission at a wavelength of more than 500 nm, and such that the positioning of said source 5 is designed to allow display through said glass-ceramic plate 2.

The display assembly according to the invention comprises a plate, preferably a hob, intended to be integrated into a cooking range, the latter comprising the hob and the heating elements, for example radiant or halogen heating elements or induction heating elements. The display is made through the plate using a polychromatic luminous device that emits in a first wavelength of 400 to 500 nm and at least in a second wavelength above 500 nm. The inventors have discovered, surprisingly, that the combination of these various wavelengths emitted by the luminous device and their respective absorptions through the glass-ceramic plate makes it possible to display all the shades of color perceptible to the human eye. Such a display assembly integrated into a cooking range consequently provides an infinite number of shades in terms of color and light intensity. Such an invention makes it possible to produce a variety of animation effects on the cooking range by associating, for example, spaces or functions with particular colors.

The term "monochromatic light source" in the context of the present invention defines a light source that has a single emission peak in the visible wavelength range and such that the width of the peak varies from 1 to 100 nm, preferably from 5 to 50 nm and even 10 to 30 nm.

The term "polychromatic light source" in the context of the present invention defines a light source which has at least two emission peaks in the visible wavelength range. It may be an LED and/or a display based on one or more LEDs, with an emission spectrum having a main emission peak and a fluorescence emission peak, wider than the main peak and of lower intensity.

The optical transmission of the glass-ceramic plate of the display assembly described above, for a thickness of 4 mm, is preferably between 0.4% and 1.5% for at least a wavelength between 400 and 500 nm.

Advantageously, the optical transmission for a thickness of 4 mm is preferably between 0.2% and 4%, especially between 0.4% and 1.5%, for any wavelength between 400 and 500 nm.

Higher transmissions would result in the heating elements being visible even outside heating periods, something which is to be excluded. In the case of lower transmissions on the other hand, the visibility of the blue or green displays would be too low.

The light transmission in the context of the ISO 9050 (2003) standard and using the illuminant $D_{65}$ is preferably less than or equal to 3%, or less than or equal to 2% and even less than or equal to 1% for a plate 4 mm in thickness. Thus, the heating elements are not visible when they have been turned off.

The term "light transmission" is understood to mean the total transmission, taking into account both direct transmission and possible diffuse transmission. For example, a spectrophotometer provided with an integrating sphere is therefore used, the transmission measured at a given thickness then being converted to the reference thickness of 4 mm using methods known to those skilled in the art, including in particular the ISO 9050 (2003) standard.

The expression "glass-ceramic of the lithium aluminosilicate type" of the display assembly according to the invention is preferably understood to mean a glass-ceramic that comprises the following constituents, in the limits defined below expressed in percentages by weight:

| | |
|---|---|
| $SiO_2$ | 52-75% |
| $Al_2O_3$ | 18-27% |
| $Li_2O$ | 2.5-5.5% |
| $K_2O$ | 0-3% |
| $Na_2O$ | 0-3% |
| ZnO | 0-3.5% |
| MgO | 0-3% |
| CaO | 0-2.5 |
| BaO | 0-3.5% |
| SrO | 0-2% |
| $TiO_2$ | 1.2-5.5% |
| $ZrO_2$ | 0-3% |
| $P_2O_5$ | 0-8%. |

This glass-ceramic may comprise up to 1% by weight of non-essential constituents that do not affect the melting of the mother glass or the subsequent devitrification that results in the glass-ceramic.

Preferably, the glass-ceramic of the lithium aluminosilicate type of the display assembly according to the invention comprises the following constituents in the limits defined below, expressed in percentages by weight:

| | |
|---|---|
| $SiO_2$ | 64-70% |
| $Al_2O_3$ | 18-25% |
| $Li_2O$ | 2.5-3.8% |
| $K_2O$ | 0-<1.0% |
| $Na_2O$ | 0-<1.0% |
| ZnO | 1.2-2.8% |
| MgO | 0.30-1.5% |
| CaO | 0-1% |
| BaO | 0-3% |
| SrO | 0-1.4% |
| $TiO_2$ | 1.8-3.2% |
| $ZrO_2$ | 1.0-2.5%. |

The barium oxide content is preferably between 1 and 3%, especially between 2 and 3%, so as to reduce the viscosity of the glass. For the same reason, the silica content is preferably less than or equal to 68%, especially 67% or even 66%. The inventors have also been able to demonstrate that there is a very pronounced effect of the lime (CaO) content on the reduction in viscosity, even for very small amounts added. For this reason, the CaO content is at least 0.2%, especially 0.3% and even 0.4%.

The best results are obtained for alumina ($Al_2O_3$) contents of 23% or less, especially 20.5%.

To achieve the desired optical properties, colorants are added to the composition. Thus, the chemical composition of the plate of the display assembly according to the invention preferably comprises vanadium oxide having a weight content of between 0.01% and 0.2%. This content is even preferably less than or equal to 0.05%, or 0.04% or 0.03% or even 0.025% or 0.02%. The preferred vanadium oxide contents are between 0.01 and 0.03%.

High vanadium oxide contents darken the plate and consequently result in poor visibility of the display, in particular in the blue. Lower contents on the contrary lighten the hob.

To conceal the heating elements well, the plate according to the invention may furthermore contain, especially in combination with vanadium oxide, the following coloring agents within the following weight ranges:

| | |
|---|---|
| $Fe_2O_3$ | 0-1%; |
| NiO | 0-1%; |
| CuO | 0-1%; |
| CoO | 0-1%; |
| MnO | 0-1%. |

Preferably the cobalt oxide content in the composition of the glass-ceramic plate of the display assembly according to the invention is less than or equal to 0.12% or even 0.02%.

The sum of the percentage contents of these coloring agents ($Fe_2O_3$, NiO, CuO, CoO and MnO) is less than or equal to 0.025%, preferably at least equal to 0.045%, but does not exceed 2%. Preferably, the hob of the display assembly according to the invention does not however contain nickel oxide, including when the vanadium content is between 0.01% and 0.03%. Chromium oxide ($Cr_2O_3$) is an impurity frequently found in most batch materials, in particular in titanium-containing compounds of the rutile type. Furthermore, certain refractories from which melting furnaces are made may contain chromium oxide or consist of chromium oxide. To obtain the desired properties, it is preferable for the chromium oxide ($Cr_2O_3$) weight content in the plate of the display assembly according to the invention to be less than or equal to 0.01%, preferably 0.0075% or even 0.006%. Limitation to such low contents means that the batch materials must be carefully selected and the presence of chromium oxide refractories in contact with the molten glass has to be avoided.

Preferably, the manganese oxide (MnO) weight content in the plate of the display assembly according to the invention is less than or equal to 0.1%, preferably 0.045% or even 0.025%.

The chemical composition of the plate of the display assembly according to the invention may comprise tin oxide in an amount by weight of between 0.1% and 0.5%, since tin oxide helps to promote vanadium reduction during the ceramization step, causing the appearance of color. It also helps to refine the mother glass during the melting thereof, that is to say it helps to promote the elimination of gaseous inclusions within the mass of molten glass. Other reducing agents than tin have proved to be even more effective, especially metal sulfides, as explained in greater detail in the rest of the text. The chemical composition of the hob of the display assembly according to the invention may therefore advantageously contain tin oxide with a weight content of between 0.2% and 0.35%.

The chemical composition of the plate of the display assembly according to the invention contains at most small amounts of antimony and arsenic (i.e. in amounts not exceeding 0.01% by weight, or even 0.001%), for environmental reasons and because it has proved difficult to make these oxides compatible with a forming process of the float type, in which the molten glass is poured onto a bath of molten tin.

Preferably, the chemical composition of the plate according to the invention contains no antimony and arsenic.

The chemical composition of the plate of the display assembly according to the invention may optionally comprise phosphorus oxide ($P_2O_5$) and/or rubidium oxide ($Rb_2O$) having weight contents of less than or equal to 0.1%, preferably 0.09% or even 0.07%.

The glass-ceramic of the display assembly according to the invention preferably comprises crystals of β-quartz structure within a residual glassy phase. The absolute value of its expansion coefficient is typically less than or equal to $15 \times 10^{-7}/°$ C. or even $5 \times 10^{-7}/°$ C.

Preferably, the polychromatic light source of the display assembly as described above is a polychromatic LED and/or a display based on one or more polychromatic LEDs.

Such an LED (and/or such a display based on one or more LEDs) provided as light source for the display assembly according to the present invention is polychromatic and possesses an emission spectrum comprising at least two peaks at different wavelengths. As a result, the color perceived by the observer through the plate is a mixture of the various wavelengths transmitted by the plate.

The inventors have discovered, surprisingly, that adjusting the emission spectrum of commercial polychromatic LEDs (or choosing the LED (and/or the display based on one or more LEDs) that give the best compromise directly), in combination with the fixed transmission spectrum of the glass-ceramic plate used in the display assembly, makes it possible to obtain color displays substantially throughout the range of the visible spectrum. The LEDs and/or displays based on LEDs are particularly suitable for this type of use, provided that they provide a multitude of emission spectra according to the chosen adjustment. The choice of source as a function of the desired illumination through the plate will be explained further below.

Advantageously, the polychromatic LED (and/or the display based on one or more LEDs)) emits with a first emission between 400 and 500 nm and with a second emission above 500 nm. LEDs commonly called "hybrid LEDs" (electroluminescent crystal+photoluminescent phosphor(s)) enable such emission spectra to be obtained. Such LEDs, the spectrum of which has a very broad secondary emission, are easy to obtain commercially. The white LEDs used in the context of the invention are for example manufactured from a semiconductor crystal chip, such as one made of indium gallium nitride (InGaN) emitting in the blue covered with a transparent (silicone or epoxy) resin containing inorganic luminophores (for example YAG:Ce), which absorbs the blue and emits in the yellow. The following LEDs or displays based on LEDs may also be mentioned:

the XLamp® LED range of "High Brightness LED" from the company CREE (USA);
the following ranges: NichiaHelios, NichiaRigel, "LED-lamp", NSSM, NSSW, NSEW, NS9 and NS2 references from the company Nichia (Japan);
the series of white "TOPLED®" from the company OSRAM (Germany);
the "Luxeon® Rebel White" and "Luxeon® K2" range from the company Philips Lumileds (USA); and
the LEDs with the following references: E1S19, E1S27, E1S62, E1S66, E1S67, E1SAG, E1SAP, EASAA, EASAU, EASAV, E1L4x and E1L5x from the company Toyoda Gosei (Japan).

Displays based on one or more LEDs are luminous display devices, the "primary" light source of which consists of one or more LEDs, usually covered with a diffusing element. These devices, intended for displaying alpha-numeric symbols/words, are generally composed of luminous "segments" (for example 7-segment displays), dots (matrix displays) or bars. The following displays based on one or more LEDs may be mentioned:

white 7-segment displays of the HDSM-431W and HDSM-433W references from the company Avago Technologies (USA);
"Dot Matrix®" matrix displays from the company KingBright, for example with the reference TA20-11YWA;
"Bar Graph Array®" bar displays from the company KingBright, for example with the reference DC10YWA.

It is also possible to use LEDs with an emission of high intensity in the visible beyond 500 nm and with a narrower emission peak, but of lower intensity, between 400 and 500 nm.

Preferably, the polychromatic light source of the luminous device of the display assembly described above is a polychromatic LED (and/or a display based on one or more LEDs) which emits with a first emission peak between 430 and 470 nm (limits inclusive), preferably 450 nm, and a second peak between 540 and 560 nm (limits inclusive), preferably 555 nm. Such a source, suitably regulated, makes it possible to obtain a white display through the glass-ceramic plate of the display assembly described above. By producing such a white display through an essentially dark brown glass-ceramic plate makes it possible to achieve particularly desirable luminous effects in terms of design.

Advantageously, the polychromatic LED (and/or the display based on one or more LEDs) emits with a first emission peak at between 430 and 470 nm, preferably 450 nm, and a second peak at between 540 and 560 nm (limits inclusive), preferably 555 nm, the second peak being advantageously of lower intensity than the first. The inventors have shown that, with the glass-ceramic plates used, such LEDs (or display) would allow the best color rendition of white displays.

Preferably, the polychromatic light source of the luminous device of the display assembly described above is a polychromatic LED (and/or display based on one or more LEDs) consisting of three monochromatic sources (the sources may be in the same LED or may be three independent monochromatic LEDs), the intensities of which are designed to be adjusted independently: such LEDs (often called "RGB" LEDs), for example consisting of three different sources each having the emission spectrum of one of the three primary colors (red, green and blue), provides an emission spectrum personalized according to the desired application in terms of coloration and light intensity through the glass-ceramic plate.

The light source of the luminous device of the display assembly according to the present invention may also comprise, individually or in combination with the light sources described above, any type of display, such as displays based on LEDs (seven-segment displays, matrix displays, etc.).

The flux emitted by the LED and/or the display based on one or more LEDs (in the visible) is adapted to the desired luminance (light) level through the glass-ceramic plate, given the spectrum of the LED (and/or the display) and the spectral transmission (in the visible) of the plate. A person skilled in the art of LED-based light displays knows how to vary the parameters of the source in order to obtain the desired luminance.

The invention also relates to a method of adjusting and/or selecting at least one light source of the polychromatic luminous device of the display assembly as described above.

For a set of N (N≥2) glass-ceramic plates, the method comprises the following steps:

1) define the color coordinates ($x_c$, $y_c$) of the target (according to the CIE 1931 model) for a display with a chosen shade of color in transmission through the N glass-ceramic plates;

2) choose the spectrum and calculate the color coordinates $(x^r_s, y^r_s)$ of an adjustment polychromatic source which, in transmission through the N plates, gives an average color rendition substantially close to the target color rendition $(x_c, y_c)$; and 3) minimize the distance between the set of color coordinates $(x^i_t, y^i_t)$ of the glass-ceramic plate and the average color coordinates $(\overline{x}_t, \overline{y}_t)$ for N glass-ceramic plates, while keeping the distance between the average color coordinates $(\overline{x}_t, \overline{y}_t)$ for N glass-ceramic plates and the color coordinates $(x_c, y_c)$ of the target below a value acceptable for the intended application.

For one glass-ceramic plate (N=1), the method comprises the following steps:

1) define the color coordinates $(x_c, y_c)$ of the target (according to the CIE 1931 model) for a display with a chosen shade of color in transmission through the glass-ceramic plate;

2) choose the spectrum and calculate the color coordinates $(x^r_s, y^r_s)$ of a polychromatic source which, in transmission through the plate, gives an average color rendition substantially close to the target rendition $(x_c, y_c)$; and 3) minimize the distance between the color coordinates $(x_t, y_t)$ of the source through the glass-ceramic plate and the color coordinates $(x_c, y_c)$ of the target.

The inventors have demonstrated that the most appropriate solution for selecting a light source, so as to obtain a display with a certain color and with the desired shade, firstly consists in defining, in the CIE 1931 color diagram, the perceived color as a function of the color coordinates (x, y).

The method described above serves to obtain a substantially identical display for a group of N different glass-ceramic plates using the same source. This method is also useful for determining which light source gives a color rendition substantially identical for each plate of a given type, despite the differences in structure and composition of the material due to the manufacture. In other words, step 3) serves to obtain the same color rendition for N different plates or to take into account the manufacturing tolerances for a given plate.

The target, that is to say the display through the plate, in terms of color rendition, has the color coordinates $(x_c, y_c)$. Having defined the color coordinates $(x_c, y_c)$ of the "target" display, the aim is to determine the color coordinates $(x_s, y_s)$ of the polychromatic source for obtaining the desired color rendition through the plate.

A set of N glass-ceramic plates, the chemical compositions and the optical transmissions of which are such as described above for the display assembly according to the invention, is considered.

Let $(x^i_t, y^i_t)$ be the color coordinates of the color rendition obtained in transmission through plate i (i ranging from 1 to N), using the adjustment polychromatic source that emits substantially within the entire visible wavelength range and has the color coordinates $(x^r_s, y^r_s)$. Thus an area in the CIE 1931 diagram in which the N color coordinates $(x^i_t, y^i_t)$ are located is defined.

Let $(\overline{x}_t, \overline{y}_t)$ be the color coordinates of the average color transmitted through the N glass-ceramic plates, the mathematical expression for which is given below:

$$\overline{x}_t = \frac{1}{N}\sum_{i=1}^{N} x^i_t; \quad \overline{y}_t = \frac{1}{N}\sum_{i=1}^{N} y^i_t \qquad (i)$$

To have an identical color rendition of the display in transmission through the N glass-ceramic plate selected, for example a white color rendition, the aim is to make the size of the area in the CIE 1931 diagram where the N color coordinate points $(x^i_t, y^i_t)$ (i ranging from 1 to N) are located as small as possible. This may be achieved by minimizing the quantity:

$$\frac{1}{N}\sum_{i=1}^{N} \sqrt{(x^i_t - \overline{x}_t)^2 + (y^i_t - \overline{y}_t)^2} \qquad (ii)$$

To obtain a defined color, for example white, the aim is to make the distance between the average color coordinates $(\overline{x}_t, \overline{y}_t)$ for the N glass-ceramic plates and the color coordinates $(x_c, y_c)$ of the target, in the CIE 1931 chromaticity diagram, smaller than an acceptable limit value depending on the intended application.

This distance may be calculated/evaluated/estimated by means of the following equation:

$$\sqrt{(\overline{x}_t - x_c)^2 + (\overline{y}_t - y_c)^2} \qquad (iii)$$

The limit value chosen will be 0.05, preferably 0.01 and even more preferably 0.005.

Using equations (ii) and (iii) to carry out step 3) of the method, the color coordinates $(x_s, y_s)$ of the sources that can be used to obtain the desired luminous effect are then known.

The subject of the invention is also a hob comprising a display assembly as described above and at least one heating element, for example a radiant or halogen heating element or an induction heating element.

The invention will be better understood in the light of the examples, together with the appended drawings and graphs, given solely by way of illustration, which must in no way be interpreted as being limiting, in which.

Figure 2:
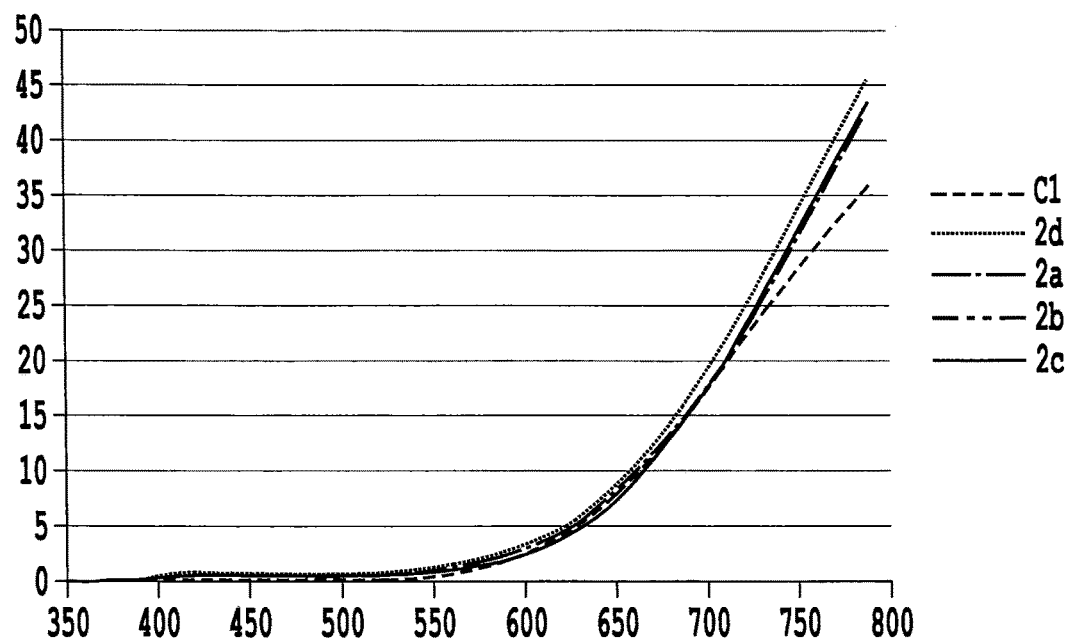
FIGS. 2 and 3 represent the optical transmission spectrum of various glass-ceramic plates used in a display assembly according to the present invention (FIG. 3 is an enlargement of the spectrum shown in FIG. 2). In the graph, the percentage amount of light transmitted by the plate is plotted on the y-axis as a function of the wavelength, in nanometers, of the transmitted beam, given on the x-axis.
Figure 3:
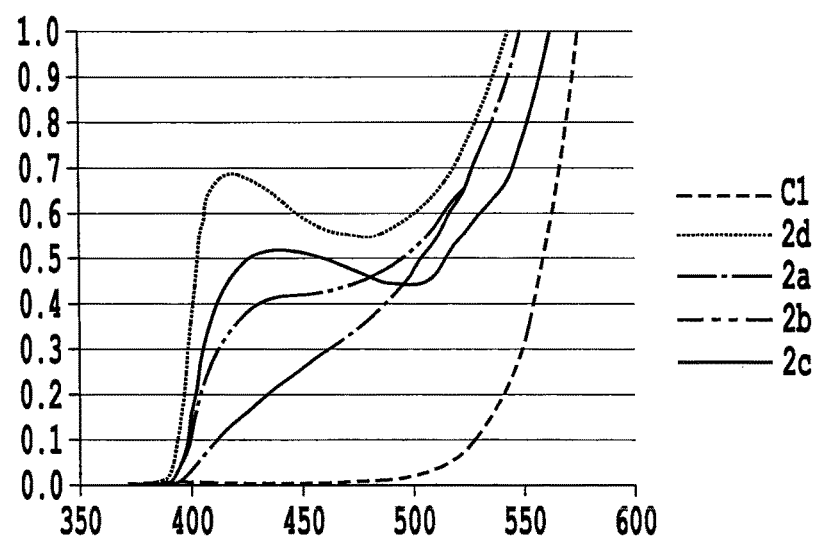

FIGS. 5, 7, 9, 11 and 13 represent the spectrum of the radiation transmitted by the polychromatic LEDs, the emission spectra of which are illustrated in FIGS. 4, 6, 8, 10 and 12 respectively, through the glass-ceramic plates having the transmission spectra shown in FIGS. 2 and 3. In these FIGS. 5, 7, 9, 11 and 13, the relative transmitted light intensity with respect to the maximum, taken as equal to 1, is plotted on the y-axis as a function of the wavelength, in nanometers, of the transmitted beam, given on the x-axis; and FIG. 14 shows the spectrum of the radiation emitted by a polychromatic LED obtained through two glass-ceramic plates of different composition. The dotted curve corresponds to the emission of the LED selected at the start in order to carry out the calculations. An identical display through two plates is obtained with the spectrum corresponding to the solid curve.

Figure 1:
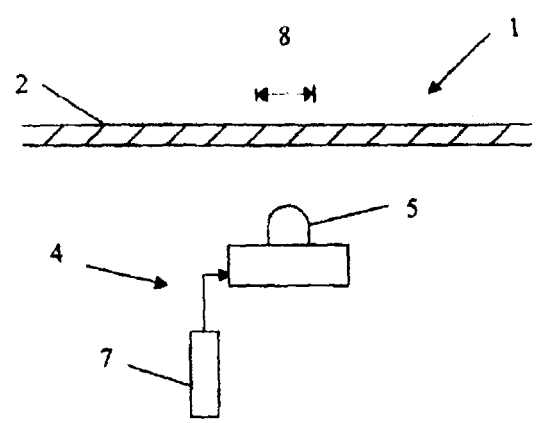
FIG. 1 shows, seen side-on and in cross section, one embodiment of a display assembly according to the present invention.

The display assembly 1 shown in FIG. 1 comprises a glass-ceramic plate 2 of chemical composition 3a, 3b, 3c or 3d, and a luminous device 4 comprising a polychromatic source 5 (consisting of an LED 6a, 6b, 6c, 6d or 6e) and a control means 7. In operation, the polychromatic source 5 emits a light beam that passes through the plate 2 in the display zone 8. The distance between the source 5 and the plate 2 is less than or equal to 5 mm, and may especially be less than 2 mm or even 1 mm.

The beam emitted by the source 5 has a width of between 0 and 5 mm. In the present case, the width of the beam is greater than 0.5 mm.

Table 1 gives the chemical compositions C1, 3a, 3b, 3c and 3d of various glass-ceramic plates 2, indicating the percentage contents by weight of the oxides.

Composition C1 (comparative example) is the chemical composition of a glass-ceramic plate having very low transmissions between 400 and 500 nm, resulting in practically zero visibility of the LEDs that emit only within this range of the spectrum (blues to green . . . ).

Compositions 3a to 3d are examples of the chemical composition of the glass-ceramic plate 2 of the display assembly 1 according to the invention.

TABLE 1

|  | C1 | 3a | 3b | 3c | 3d |
|---|---|---|---|---|---|
| $SiO_2$ | 68.7 | 65.5 | 65.5 | 65.5 | 64.7 |
| $Al_2O_3$ | 18.9 | 20.3 | 20.3 | 20.3 | 20.45 |
| $Li_2O$ | 3.5 | 3.8 | 3.8 | 3.8 | 3.75 |
| $TiO_2$ | 2.6 | 2.9 | 2.9 | 2.9 | 3.02 |
| $ZrO_2$ | 1.7 | 1.3 | 1.3 | 1.3 | 1.35 |
| ZnO | 1.6 | 1.5 | 1.5 | 1.5 | 1.52 |
| MgO | 1.3 | 0.4 | 0.4 | 0.4 | 0.36 |
| CaO | — | 0.5 | 0.4 | 0.4 | 0.44 |
| BaO | 0.8 | 2.6 | 2.6 | 2.6 | 2.5 |
| $Na_2O$ | 0.1 | 0.6 | 0.6 | 0.6 | 0.62 |
| $K_2O$ | 0.1 | 0.2 | 0.2 | 0.2 | 0.25 |
| MnO | — | 0.02 | 0.02 | 0.02 | — |
| $SnO_2$ | — | 0.3 | 0.3 | 0.3 | 0.25 |
| $V_2O_5$ | 0.2 | 0.028 | 0.028 | 0.028 | 0.025 |
| $Fe_2O_3$ | 0.1 | 0.1 | 0.1 | 0.1 | 0.087 |
| $As_2O_3$ | 0.4 | — | — | — | <0.01 |
| $Sb_2O_3$ | — | — | — | — | <0.01 |
| $Cr_2O_3$ | — | 0.0054 | 0.0017 | 0.0012 | — |
| CoO | — | — | — | 0.0147 | — |
| $P_2O_5$ | — | — | — | — | 0.07 |
| $Rb_2O$ | — | — | — | — | 0.09 |
| $B_2O_3$ and/or F | — | — | — | — | <0.01 |
| White LED visibility | Zero | Good | Good | Good | Good |

Table 1 gives compositions of glass-ceramic plate specimens 3a, 3b, 3c and 3d, of the display assembly 1 for which white displays are obtained. The transmission spectra given in FIGS. 5, 7, 9, 11 and 13 show that a white display is obtained by using the appropriate LEDs (LEDs 6a to 6e), the spectral emission characteristics of which are given in FIGS. 4, 6, 8, 10 and 12.

Emission of the Transmission Spectra Measurement Protocol

The various glass-ceramic plates are measured on specimens measuring 50 mm×50 mm, the textured (pimpled) face of which was removed by thinning/polishing the specimen. The measurement is carried out by means of a spectrophotometer, for example a Perkin Elmer Lambda950 spectrophotometer.

The emission of the transmission spectra are measured using an integrating sphere (for example a SphereOptics SPH-12-X integrating sphere) coupled to a spectrophotometer (for example an Instrument Systems CAS140 spectrophotometer).

FIGS. 2 and 3 show the transmission spectra of the plates having the compositions C1, 3a, 3b, 3c and 3d given in Table 1. The specimens of plates 2 of compositions 3a to 3d all have a relatively high optical transmission between 400 and 500 nm, compared with the specimen of plate 2 of composition C1. This is because composition C1 is typically that of plates normally used in cooking ranges that transmit well only for wavelengths in the red.

FIGS. 4, 6, 8, 10 and 12 show the emission spectrum of an example of polychromatic LEDs 6a to 6e of the luminous device 4 of the display assembly 1. These LEDs were selected so as to obtain a white color rendition of the display through the glass-ceramic plate 2. These LEDs 6a to 6e all have in particular a first emission peak with a maximum between 400 and 500 nm and a second emission peak with a maximum between 500 and 650 nm.

Figure 4:
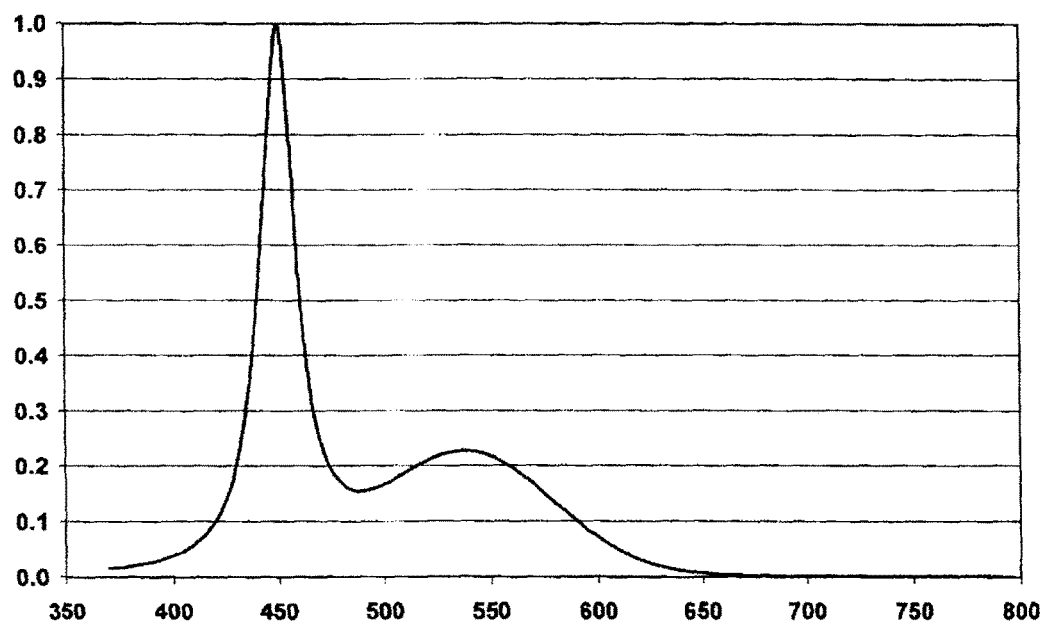
FIGS. 4, 6, 8, 10 and 12 represent the emission spectrum of an example of polychromatic LEDs of a display assembly according to the invention. In these figures, relative emitted light intensity with respect to the maximum, taken as equal to 1, is plotted on the y-axis as a function of the wavelength, in nanometers, of the incident beam, given on the x-axis.

FIG. 4 shows the normalized emission spectrum of the LED 6a, the characteristics of which are the following:
Blue peak:
Intensity=1.0 (unitless)
Position=450 nm
Width=20 nm
"Yellow" peak:
Intensity=0.22 (unitless)
Position=540 nm
Width=93 nm.

This spectrum has the CIE 1931 color coordinates $x_s=0.211$; $y_s=0.219$.

Figure 5:
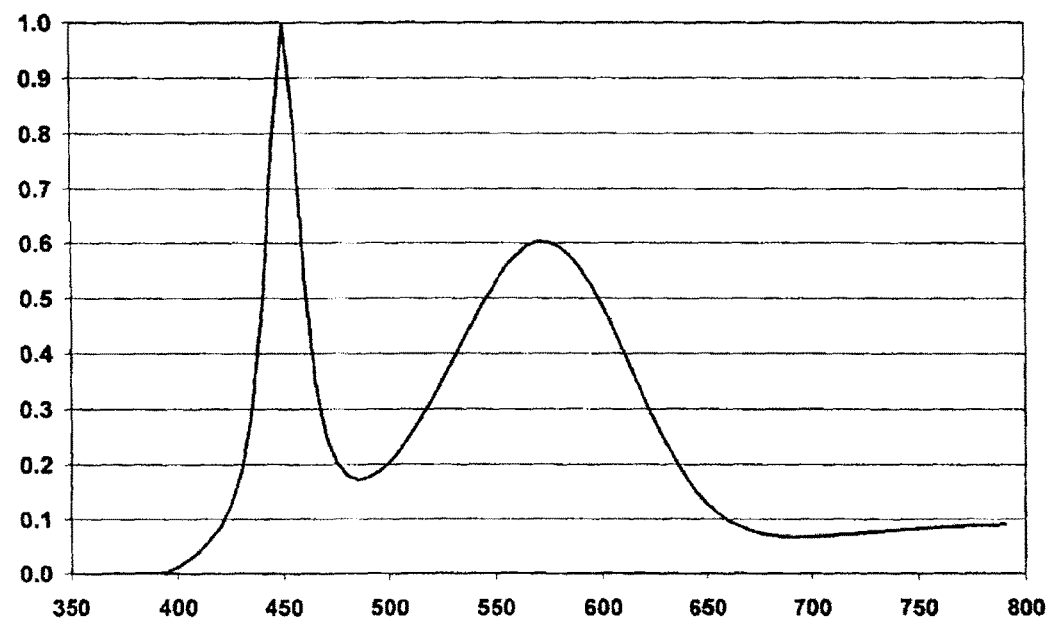

The normalized spectrum transmitted from the LED 6a through the glass-ceramic plate specimen of composition 3b is plotted in FIG. 5. This spectrum has the color coordinates $x_t=0.335$ and $y_t=0.339$, giving a "white" color rendition of the LED display through the glass-ceramic plate in question.

Figure 6:
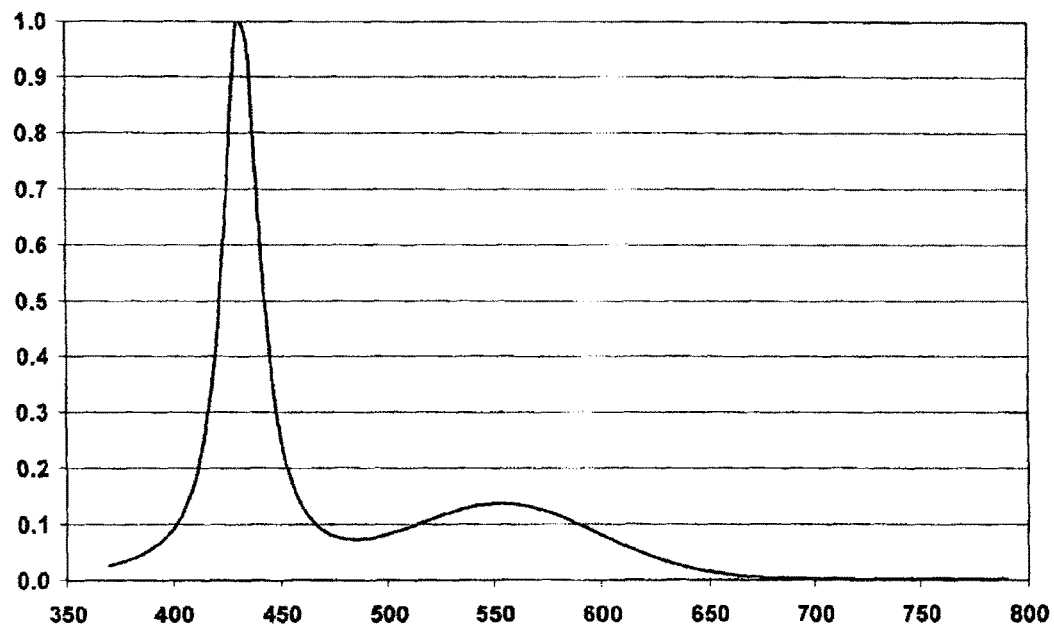

FIG. 6 shows a normalized emission spectrum of the OSRAM LED with the reference LUW-G5AP "Ultra-White" (LED 6b). This spectrum has the following characteristics:
Blue peak:
Intensity=1.0 (unitless)
Position=432 nm
Width=20 nm
"Yellow" peak:
Intensity=0.13 (unitless)
Position=555 nm
Width=105 nm.

This spectrum has the CIE 1931 color coordinates $x_s=0.230$; $y_s=0.180$.

Figure 7:
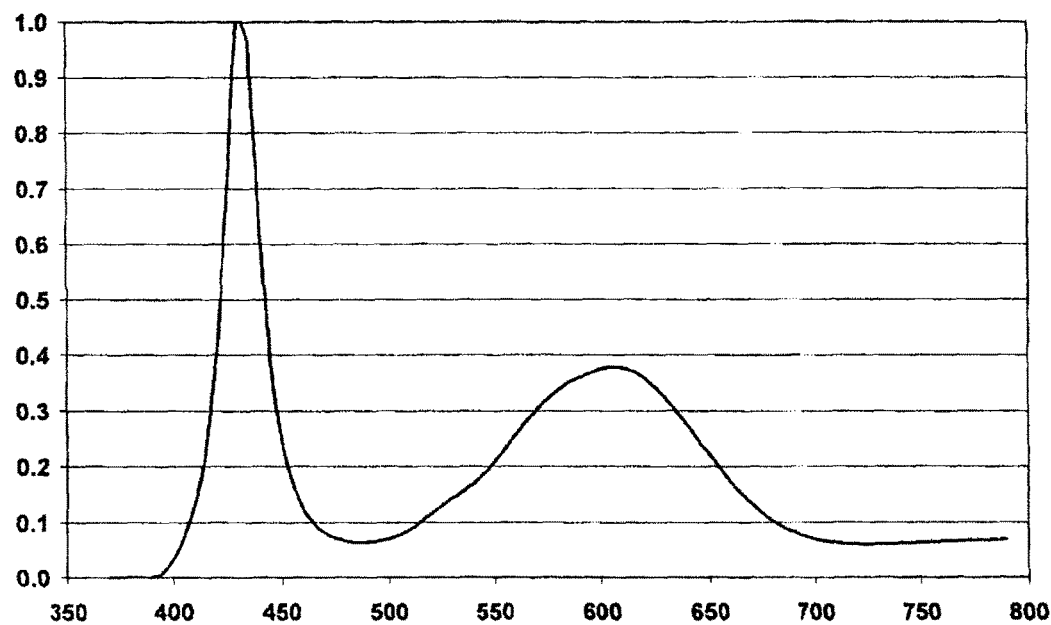

The normalized spectrum transmitted from the LED 4b through the glass-ceramic plate specimen of composition 3c is plotted in FIG. 7. The transmitted spectrum has the color coordinates $x_t=0.356$ and $y_t=0.263$, giving a "pinky white" color rendition of the LED through the glass-ceramic plate in question.

Figure 8:
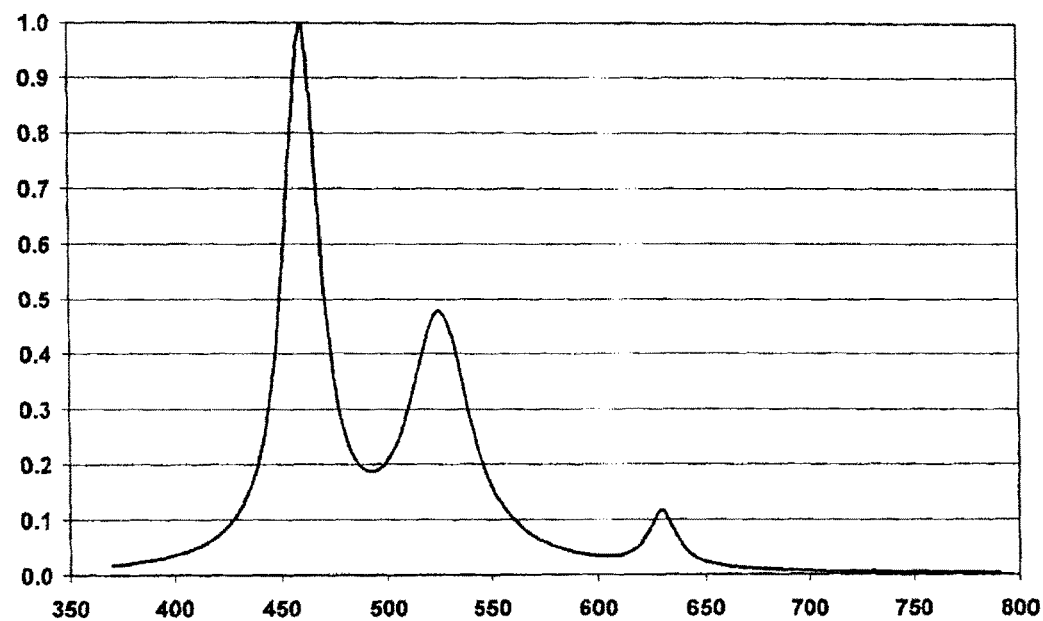

FIG. 8 shows the normalized emission spectrum of an RGB LED 6c, the characteristics of which are the following:
Blue peak:
Intensity=1.0 (unitless)
Position=460 nm
Width=20 nm
Green peak:
Intensity=0.47 (unitless)
Position=525 nm Width=35 nm.
Red peak:
Intensity=0.11 (unitless)
Position=630 nm
Width=15 nm.

This spectrum has the CIE 1931 color coordinates $x_s$=0.184; $y_s$=0.250.

Figure 9:
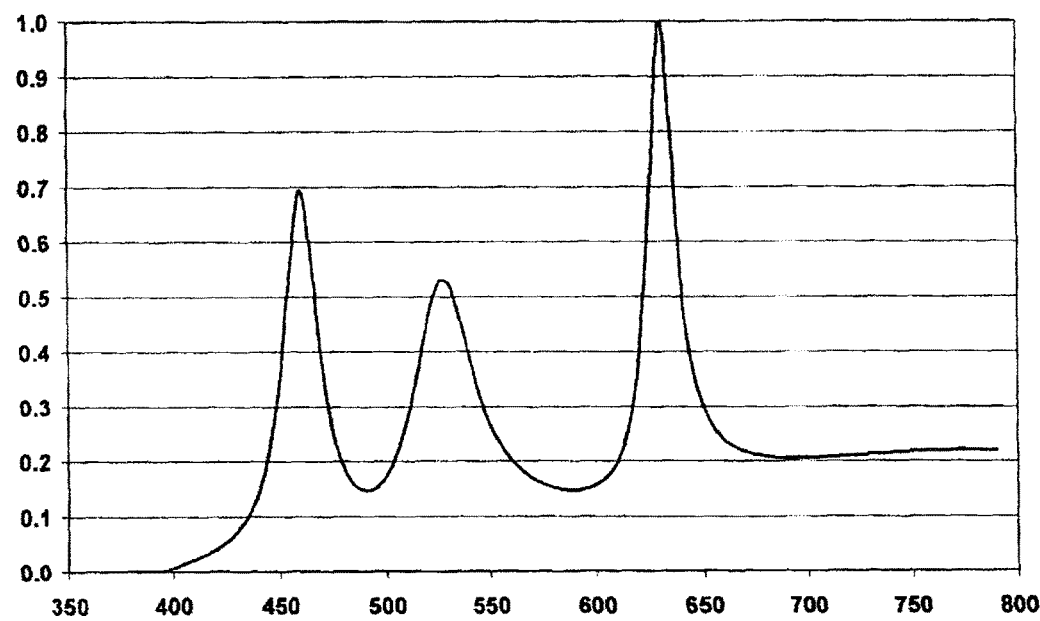

The normalized spectrum transmitted from the LED 6c through the glass-ceramic plate specimen of composition 3b is plotted in FIG. 9. The transmitted spectrum has the color coordinates $x_t$=0.335 and $y_t$=0.338, giving a "white" color rendition of the LED through the glass-ceramic plate in question.

Figure 10:
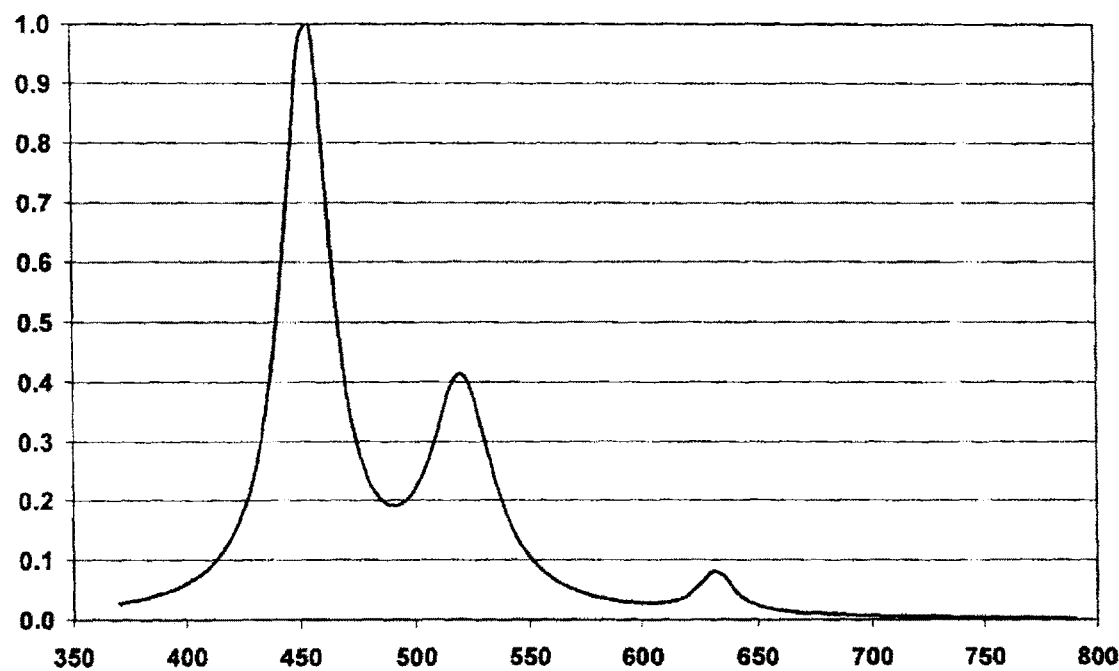

FIG. 10 shows a normalized emission spectrum of the OSRAM RGB LED with the reference LRTD-C9TP (LED 6d). This spectrum has the following characteristics:
Blue peak:
Intensity=1.0 (unitless)
Position=453 nm
Width=25 nm
Green peak:
Intensity=0.38 (unitless)
Position=520 nm
Width=33 nm
Red peak:
Intensity=0.07 (unitless)
Position=632 nm
Width=18 nm.

This spectrum may be obtained with said LED by independently controlling the current with which each of the chips (R, G, or B) is supplied. By so doing, the spectrum of the LED has the CIE 1931 color coordinates $x_s$=0.173; $y_s$=0.185.

Figure 11:
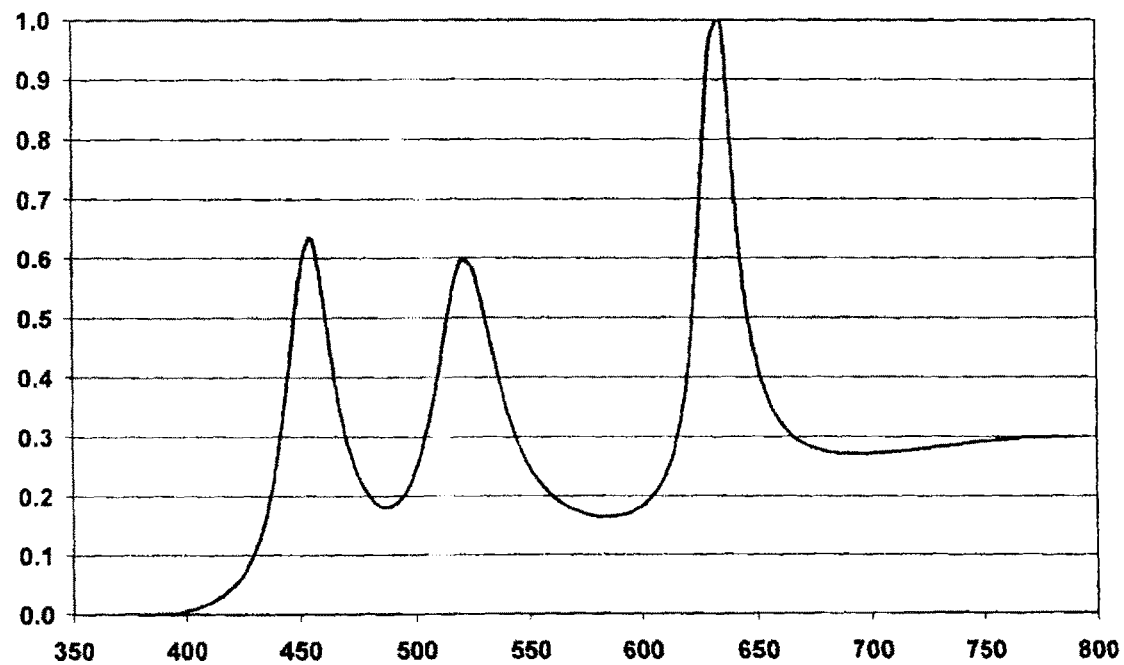

The normalized spectrum transmitted from the LED 6d through the glass-ceramic plate specimen of composition 3a is plotted in FIG. 11. The transmitted spectrum has the color coordinates $x_t$=0.337 and $y_t$=0.332, giving a "white" color rendition of the LED through the glass-ceramic plate in question.

Figure 12:
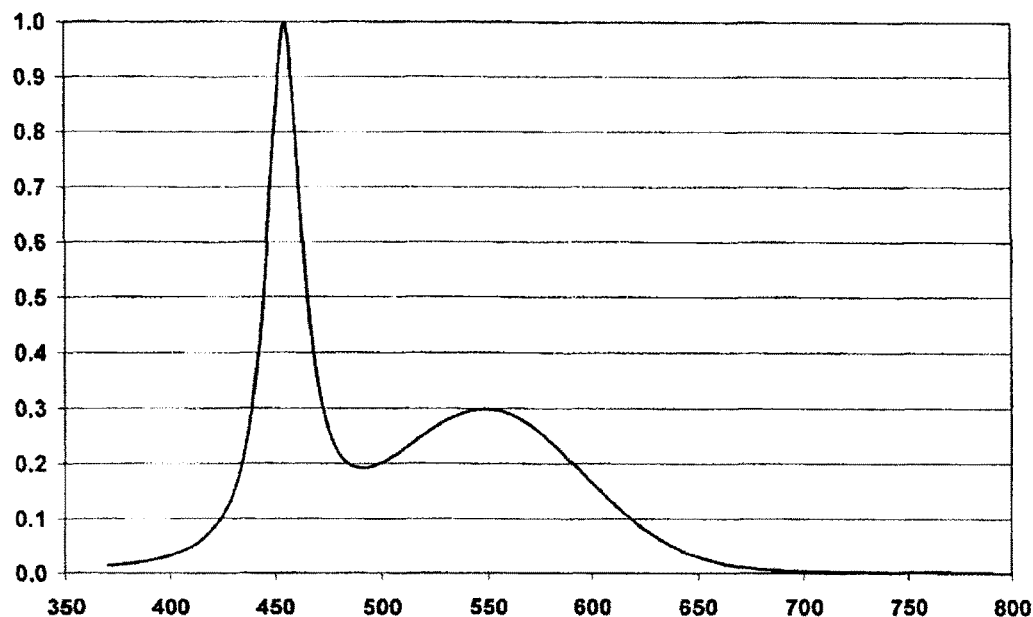

FIG. 12 shows a normalized emission spectrum of the 7-segment LED display from Avago Technologies (reference HDSM-431W) (LEDs 6e). This spectrum has the following characteristics:
Blue peak:
Intensity=1.0 (unitless)
Position=455 nm
Width=20 nm
"Yellow" peak:
Intensity=0.3 (unitless)
Position=551 nm
Width=108 nm.

This spectrum has the CIE 1931 color coordinates $x_s$=0.250; $y_s$=0.270.

Figure 13:
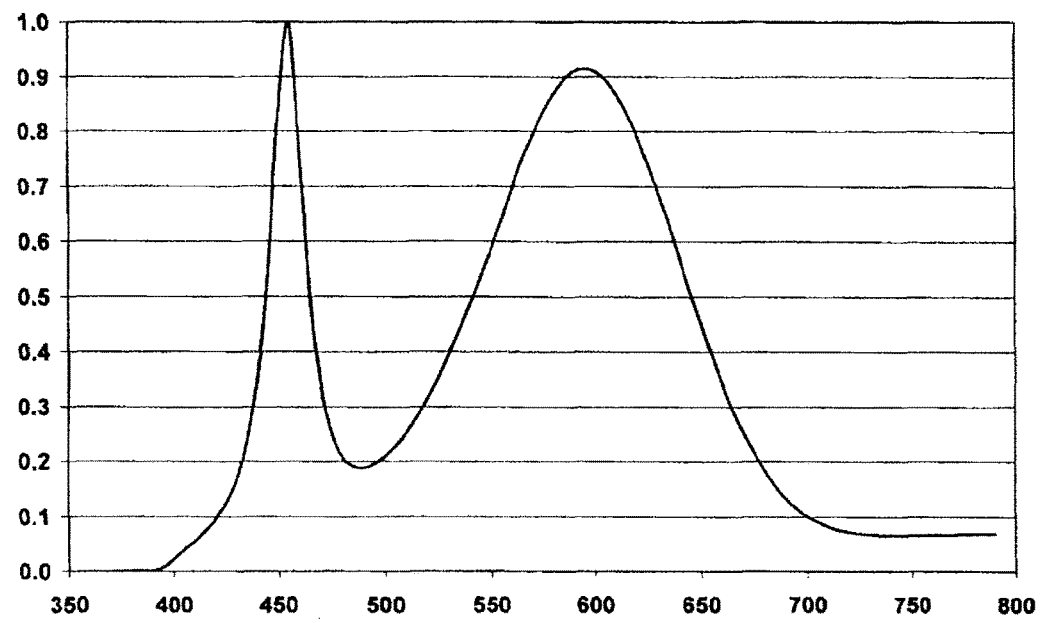
Figure 14:
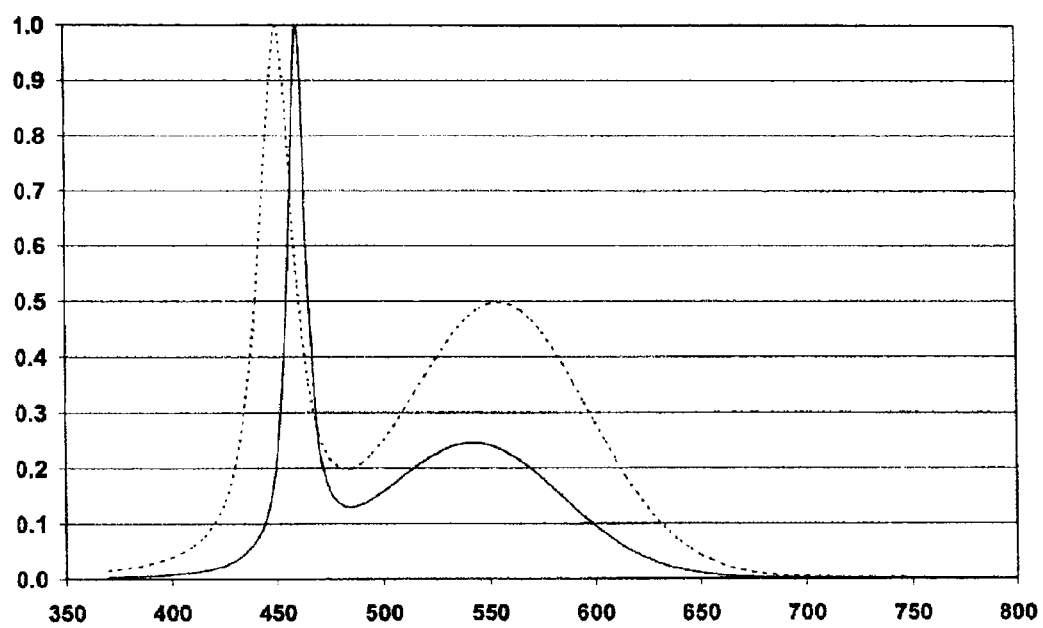

The normalized spectrum transmitted from the LED system 6e through the glass-ceramic plate specimen of composition 3d is plotted in FIG. 13. The transmitted spectrum has color coordinates $x_t$=0.401 and $y_t$=0.353, giving an "orangey-white" color rendition of the LEDs through the glass-ceramic plate in question.

FIG. 14 shows a result obtained by applying the method of adjusting and/or selecting a light source. The plate specimens from which the calculations were made are the two glass-ceramic plates of composition 3b and 3d. The dotted curve represents the initial normalized emission spectrum of the LED used at the start of the method of selecting a light source. The solid curve represents the normalized final emission spectrum of the LED obtained at the end of the method. The acceptable limit value, as defined in step 3 of the method, is taken as 0.01.

The characteristics of these spectra are the following:

Initial Spectrum

Blue peak:
Intensity=1.0 (unitless)
Position=450 nm
Width=20 nm
"Yellow" peak:
Intensity=0.50 (unitless)
Position=555 nm
Width=100 nm Final Spectrum Blue peak:
Intensity=1.0 (unitless)
Position=4660 nm
Width=10 nm
"Yellow" peak:
Intensity=0.25 (unitless)
Position=542.9 nm
Width=98.5 nm.

The predictions made beforehand by the calculations, in accordance with the method of selecting the light source of the polychromatic luminous device of the display assembly according to the invention are therefore confirmed.

The invention claimed is:

1. A display assembly, comprising a glass-ceramic plate comprising a lithium aluminosilicate and a luminous device comprising a polychromatic light source, wherein:

the glass-ceramic plate comprises, in percentages by weight:

| | |
|---|---|
| $SiO_2$ | 64-70% |
| $Al_2O_3$ | 18-25% |
| $Li_2O$ | 2.5-3.8% |
| $K_2O$ | 0-<1.0 |
| $Na_2O$ | 0-<1.0% |
| ZnO | 1.2-2.8% |
| MgO | 0.30-1.5% |
| CaO | 0.2-2.5% |
| BaO | 0-3% |
| SrO | 0-1.4% |
| $TiO_2$ | 1.8-3.2% |
| $ZrO_2$ | 1.0-2.5%; | an optical transmission of the glass-ceramic plate for a thickness of 4 mm is between 0.2% and 4% for at least one wavelength between 400 and 500 nm;

the polychromatic light source has at least one first emission of nonzero intensity at said wavelength between 400 and 500 nm and at least one second emission at a wavelength of more than 500 nm;

the polychromatic light source is positioned to allow display through said glass-ceramic plate, the glass-ceramic plate further comprises tin oxide in an amount by weight of between 0.2% and 0.35%, the glass-ceramic plate further comprises vanadium oxide in a weight content of between 0.01% and 0.03%, the glass-ceramic plate further comprises $As_2O_3$ in a weight content of from 0% to 0.01%, the glass-ceramic plate further comprises at least one reducing agent, the glass-ceramic plate further comprises less than or equal to 0.01% by weight of chromium oxide, the glass-ceramic plate further comprises cobalt oxide in an amount by weight of 0.12% or less, the glass-ceramic plate comprises no nickel oxide, and the at least one first emission and the at least one second emission through the glass-ceramic plate allow for display of different colors.

2. The display assembly of claim 1, wherein an optical transmission of the glass-ceramic plate, for a thickness of 4 mm, is between 0.4% and 1.5% for at least one wavelength between 400 and 500 nm.

3. The display assembly of claim 1, wherein the glass-ceramic plate comprises antimony oxide and arsenic oxide in amounts not exceeding 0.01% by weight.

4. The display assembly of claim 1, wherein the glass-ceramic plate comprises less than or equal to 0.1% by weight of manganese oxide.

5. The display assembly of claim 1, wherein the polychromatic light source is a polychromatic LED.

6. The display assembly of claim 1, wherein the polychromatic light source is a polychromatic LED which emits with a first emission peak between 430 and 470 nm and a second peak between 540 and 560 nm.

7. The display assembly of claim 6, wherein the second peak is of lower intensity than the first peak.

8. The display assembly of claim 1, wherein the polychromatic light source is a polychromatic LED comprising three monochromatic sources, the intensities of which are regulated independently.

9. A hob, comprising the display assembly of claim 1 and a heating element.

10. The display assembly of claim 1, wherein the glass-ceramic plate comprises antimony oxide and arsenic oxide in amounts not exceeding 0.001% by weight.

11. The display assembly of claim 1, wherein the glass-ceramic plate contains no antimony oxide and no arsenic oxide.

12. The display assembly of claim 1, wherein the reducing agent comprises at least one metal sulfide.

13. The display assembly of claim 1, wherein the reducing agent comprises tin oxide and at least one metal sulfide.

* * * * *